(12) United States Patent
Sasaki et al.

(10) Patent No.: US 6,209,126 B1
(45) Date of Patent: Mar. 27, 2001

(54) STALL DETECTING APPARATUS, STALL DETECTING METHOD, AND MEDIUM CONTAINING STALL DETECTING PROGRAM

(75) Inventors: Yoko Sasaki; Atsushi Kunimatsu, both of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/141,342

(22) Filed: Aug. 27, 1998

(30) Foreign Application Priority Data

Aug. 27, 1997 (JP) .................................... 9-231331

(51) Int. Cl.[7] ....................................................... G06F 9/45
(52) U.S. Cl. ................................... 717/4; 712/219; 712/9
(58) Field of Search ..................................... 395/704, 709, 395/712; 708/520; 712/201, 218, 213, 215, 219, 9; 717/4, 9, 11

(56) References Cited

U.S. PATENT DOCUMENTS

| | | | |
|---|---|---|---|
| 5,051,885 | * 9/1991 | Yates, Jr. et al. | 712/215 |
| 5,053,986 | * 10/1991 | Ashan et al. | 708/520 |
| 5,664,135 | * 9/1997 | Schlansker et al. | 712/201 |
| 5,860,018 | * 1/1999 | Panwar | 712/213 |
| 5,878,244 | * 3/1999 | Witt et al. | 712/218 |
| 5,983,342 | * 11/1999 | Tran | 712/218 |

OTHER PUBLICATIONS

Healy–Whalley–Harmon, Integrating the Timing Analysis of Pipelining and Instruction Caching, Real–Time Systems Symposium, 1995. Proceedings., 16th IEEE, Dec. 1995.*

Proebsting–Fraser, Detecting Pipeline Structural Hazards Quickly, ACM SIGPLAN–SIGACT Annual Symposium on Principles of Programming Languages, Jan. 1994.*

Landi, Undecidably of Static Analysis, ACM Letters on Programming Languages and Systems, vol. 1, No. 4, pp. 323–337, Dec. 1992.*

* cited by examiner

Primary Examiner—Mark R. Powell
Assistant Examiner—Hoang-Vu Antony Nguyen-Ba
(74) Attorney, Agent, or Firm—Foley & Lardner

(57) ABSTRACT

A stall detecting apparatus and a stall detecting method reduce labor and time to develop a program.

The apparatus has an input portion for reading a source program, an interpreter for interpreting the read source program according to processor specifications, an instruction developing unit for developing the interpreted source program into states in pipeline stages of pipeline processing, and a stall detector for detecting stalls in the pipeline processing according to the states of the source program developed in the pipeline stages and providing stall information representing the detected stalls. The stall detecting method realizes these functions of the stall detecting apparatus. The method and apparatus statically analyze a given source program while the source program is being coded and efficiently detect stalls to occur in the source program. The method and apparatus display the stall information together with the source program and a pipeline image of the pipeline processing of the source program.

18 Claims, 19 Drawing Sheets

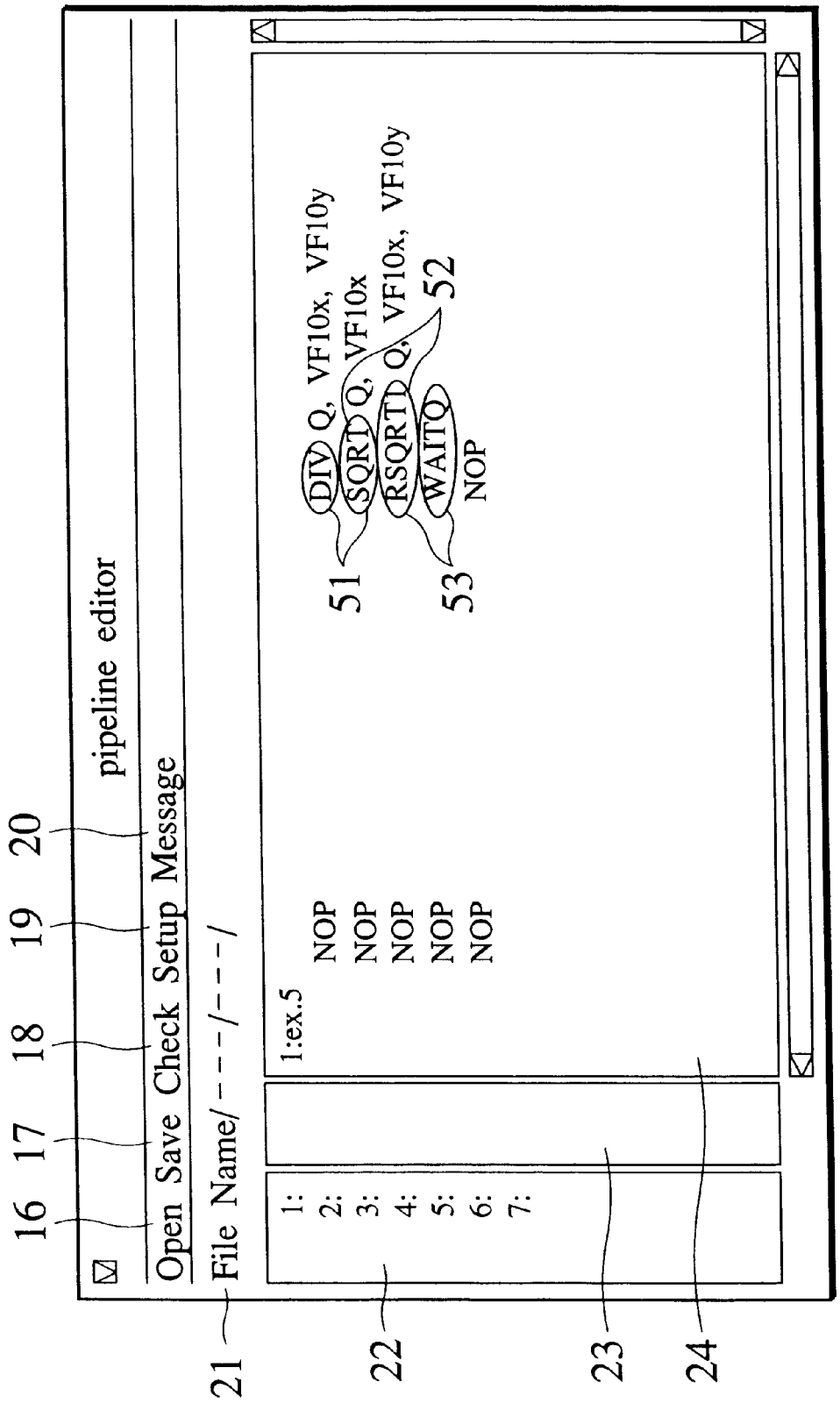

FIG.14 pipeline image

| | | | | | | | | | | | | |
|---|---|---|---|---|---|---|---|---|---|---|---|---|
| 1 | NOP | NOP | | | | | | | | | | |
| 2 | NOP | DIV Q, VF10x, VF10y | 2M | 2T | | | | | | | | |
| 3 | NOP | NOP | 3M | 2T 3T | 2X | | | | | | | |
| 4 | NOP | NOP | 4M | 3T 4T | 2X 3X | 2D1 | | | | | | |
| 5 | NOP | NOP | 5M | 4T 5T | 3X 4X | 2D1 3X | 2Y | | | | | |
| 6 | NOP | NOP | 6M | 5T 6T | 4X 5X | 3X 4X | 2Y 3Y | 2D2 | | | | |
| 7 | NOP | NOP | 7M | 6T 7T | 5X 6X | 4X 5X | 3Y 4Y | 2D2 3Y | 2Z | | | |
| 8 | NOP | ELENG P, VF10 | 8M | 7T 8T | 6X 7X | 5X 6X | 4Y 5Y | 3Y 4Y | 2Z 3Z | 2D3 | | 2D4 |
| 9 | NOP | DIV Q, VF10x VF10y | 9M | 8T 9T | 7X 8X | 6X 7X | 5Y 6Y | 4Y 5Y | 3Z 4Z | 2D3 3Z | 2S | 3S |
| 10 | NOP | NOP | 10M | 9T 10T | 8X 9X | 7X 8X | 6Y 7Y | 5Y 6Y | 4Z 5Z | 3Z 4Z | 3S 4S | 4S 5S |
| 11 | NOP | NOP | 11M | 10T 11T | 9X 10X | 8X 9X | 7Y 8Y | 6Y 7Y | 5Z 6Z | 4Z 5Z | 4S 5S | 5S 6S |
| 12 | NOP | NOP | 12M | 11T 12T | 10X 11X | 9N1 10D1 | 8Y 9Y | 7Y 8Y | 6Z 7Z | 5Z 6Z | 5S 6S | 6S 7S |
| 13 | NOP | NOP | 13M | 12T 13T | 11X 12X | 10D1 11X | 9Y 10Y | 8Y 9Y | 7Z 8Z | 6Z 7Z | 6S 7S | 7S 8S |
| 14 | NOP | NOP | 14M | 13T 14T | 12X 13X | 11X 12X | 10Y 11Y | 9Y 10Y | 8Z 9Z | 7Z 8Z | 7S 8S | 8S 9N4 |
| 15 | NOP | DIV Q, VF10x VF10y | 15M | 14T 15T | 13X 14X | 12X 13X | 11Y 12Y | 10Y 11Y | 9N3 10D3 | 8Z 9N3 | 8S 9S | 9N4 10D4 |
| 16 | NOP | NOP | 16M | 15T 16T | 14X 15X | 13X 14X | 12Y 13Y | 11Y 12Y | 10D3 11Z | 9N3 10D3 | 9S 10S | 10D4 11S |
| 17 | NOP | NOP | 17M | 16T 17T | 15X 16X | 14X 15X | 13Y 14Y | 12Y 13Y | 11Z 12Z | 10D3 11Z | 10S 11S | 11S 12S |
| 18 | NOP | NOP | 18M | 17T 18T | 16X 17X | 15X 16X | 14Y 15Y | 13Y 14Y | 12Z 13Z | 11Z 12Z | 11S 12S | 12S 13S |
| 19 | NOP | NOP | 19M | 18T 19T | 17X 17D1 | 16X 17X | 15Y 16Y | 14Y 15Y | 13Z 14Z | 12Z 13Z | 12S 13S | 13S 14S |
| 20 | NOP | NOP | 20M | 19T 20T | 18X 19X | 17X 17D1 | 16Y 17D2 | 15Y 16Y | 14Z 15Z | 13Z 14Z | 13S 14S | 14S 15S |
| 21 | NOP | NOP | 21M | 20T 21T | 19X 20X | 18X 19X | 17D2 18Y | 16Y 17D2 | 15Z 16Z | 14Z 15Z | 14S 15S | 15S 16S |
| 22 | NOP | NOP | 22M | 21T 22T | 20X 21X | 19X 20X | 18Y 19Y | 17D2 18Y | 16Z 17D3 | 15Z 16Z | 15S 16S | 16S 17S |
| 23 | NOP | NOP | 23M | 22T 23T | 21X 22X | 20X 21X | 19Y 20Y | 18Y 19Y | 17D3 18Z | 16Z 17D3 | 16S 17S | 17S 17D4 |
| 24 | NOP | NOP | 24M | 23T 24T | 22X 23X | 21X 22X | 20Y 21Y | 19Y 20Y | 18Z 19Z | 17D3 18Z | 17S 18S | 17D4 18S |
| 25 | NOP | NOP | 25M | 24T | 23X | 22X | 21Y 22Y | 20Y 21Y | 19Z 20Z | 18Z 19Z | 18S 19S | 19S 20S |

Boxes at right: 2D5 2D6 2F (55); 9N5 10D5 10F / 9N6 9N7 9N8 9N9 9N10 9N11 9N12 9N13 9N14 9N15 (56, 57); 17D5 17D6 17F (58); region label 54.

STALL DETECTING APPARATUS, STALL DETECTING METHOD, AND MEDIUM CONTAINING STALL DETECTING PROGRAM

BACKGROUND OF THE INVENTION

1. Field of the Invention

The present invention relates to a stall detecting apparatus, a stall detecting method, and a medium containing a stall detecting program. In particular, the present invention relates to a technique of statically analyzing the pipeline processing of a source program to be executed in a microprocessor so as to efficiently detect stalls to occur in the source program, to improve the execution efficiency of a program.

2. Related Art

Microprocessors are usually provided with a hardware structure for carrying out pipeline processing to improve processing efficiency.

In the pipeline processing, execution of instructions are partitioned into small parallel operations called stages. Each partitioned operation is executed simultaneously to improve the processing efficiency of instructions.

If any stall occurs during the pipeline processing, the execution efficiency of instructions greatly deteriorates. The stall is a state of delay of several clock cycles caused by some reason, and no instructions are executable during the stall.

The stall is typically caused by two types of hazards.

One hazard is a resource hazard caused by instructions that conflict with each other for a resource such as an ALU.

The other hazard is a data hazard caused by data dependence between data pieces held in registers. For example, the definition of one data piece is dependent on a result of another instruction.

If a stall occurs, it disturbs a flow of the pipeline processing of instructions so that the pipeline processing may provide no advantage in improving the processing efficiency of instructions. It is important in developing a program to check and minimize stall occurrence in advance.

To improve functions and performance, microprocessors frequently employ a hardware structure for simultaneously processing several instructions, such as VLIW (very long instruction word) and super scalar.

For microprocessors that process instructions one by one, it is possible to manually check a program for stall occurrence.

For microprocessors that simultaneously process instructions, however, it is very difficult to manually check a program for stall occurrence. This is because such microprocessors involve intricate hazard patterns in which a single instruction simultaneously causes multiple stalls. The productivity of a program for this type of microprocessors is very low.

For high-function, high-performance microprocessors that simultaneously process instructions, it is ideal, in terms of program developing efficiency and maintenance, to write a source program in high-level language and optimize it with a compiler to obtain a efficient program. A part which must be most efficient of the program, however, must manually be written in assembler language to improve the performance of the part. Such an assembler source program must be refined by removing stall locations therefrom in case that most efficiency is needed. Otherwise, an expected efficiency improvement by writing a program in assembler language will be in vain.

A tool for detecting stalls according to a related art will be explained.

This tool employs, for example, a real-time emulator to trace an execution history of a program. Steps of the related art of securing the processing efficiency of an object program by preventing stall occurrence will be explained with reference to FIG. 1. Step S1 prepares a source program. Step S2 assembles the source program into an object program. Step S3 loads the object program on a real-time emulator. Step S4 executes the object program on the real-time emulator. Step S5 analyzes an execution history, i.e., a real-time trace result provided by the emulator and provides a stall occurrence status. Step S7 corrects the source program according to the stall occurrence status. Again, step S2 assembles the corrected source program into an object program.

Step S6 repeats these steps until stall occurrence in the source program is minimized.

This related art has some problems. First, using the real-time emulator needs to actually assemble a source program and execute the assembled program on the emulator. Second, each time a source program is corrected, it must be re-compiled (assembled). Accordingly, the related art takes a long time to detect and remove stalls, and therefore, is inefficient to remove stalls and improve the efficiency of a program.

One technique of simply analyzing a program without executing the program is to use an editor. For example, there is a language sensitive editor. This editor analyzes the syntax of a source program and makes the source program reflect a result of the analysis. For example, the editor automatically colors keywords and indicates corresponding parentheses in the source program. This technique also has some problems. The language sensitive editor is originally a tool to analyze the syntax of a source program. Accordingly, first, the editor is unable to detect and analyze stalls in a source program. Namely, it is incapable of detecting, in a source program, locations to be corrected for removing stalls while the source program is being coded and being indicated. Second, the editor is unable to display a flow of pipeline processes carried out on a source program based on an analysis of the source program. In short, the editor is incapable of detecting and displaying stalls in a source program.

As explained above, the parallel processing of instructions of a program by, for example, VLIW complicates stall patterns to deteriorate the processing efficiency of the program. This is very difficult to cope with by manually detecting stalls.

To detect stalls, the related art assembles a source program into an object program and executes the object program on an emulator. If stalls are detected, the related art corrects the source program to remove the stalls, and then, again assembles the corrected source program into an object program. The related art must repeat these steps to develop a program. This takes a very long time and is quite inefficient.

SUMMARY OF THE INVENTION

The present invention has been made in order to overcome the above mentioned problems.

An object of the present invention is to provide a stall detecting apparatus, a stall detecting method, and a medium containing a stall detecting program, capable of easily detecting stalls in a source program and correcting the source program according to the detected stalls, thereby reducing labor and time needed to develop a program.

In order to accomplish the object, a first aspect of the present invention statically analyzes a source program according to processor specifications.

A basic concept of the present invention will be explained.

According to processor specifications, the present invention defines hazard information for instructions and their operands in advance.

The hazard information for instructions includes information relating to stall occurrence. The information may include, for example, the type of each instruction (whether or not the instruction is a conditional branch instruction, or whether or not the instruction has a possibility of causing a data or resource hazard) and the number of stages needed for pipeline-processing the instruction.

The hazard information for operands includes the numbers of source registers and destination registers of a corresponding instruction.

These pieces of hazard information prepared from the processor specifications are used to interpret a source program and statically detect stalls to occur in the source program due to resource and data hazards.

FIG. 2 shows an example of a stall detecting apparatus for realizing the first aspect of the present invention. The apparatus statically detects stalls to occur in a source program during the pipeline processing of the program. The apparatus has a file controller 101 for reading a source program 3, a text interpreter 202 for interpreting the source program 3 read by the file controller 101 referring to an instruction/register table (processor specifications) 201, an instruction developing unit 203 for developing the interpreted source program obtained by the text interpreter 202 into states in pipeline stages of the pipeline processing, and a stall detector 204 for detecting stalls to occur during the pipeline processing of the source program and providing stall information representing the detected stalls.

The instruction/register table 201 holds the hazard information prepared in advance for instructions and operands according to processor specifications. The text interpreter 202 interprets character strings described in the source program 3 and relates the hazard information held in the instruction/register table 201 to the interpreted source program.

The instruction developing unit 203 develops each instruction line of the interpreted source program into states in pipeline stages of the pipeline processing.

The stall detector 204 inspects the parallel processing of instructions in the pipeline stages in time series in relation to the hazard information, creates stall information indicating locations where stalls occur in the source program, and holds the stall information.

In this way, the stall detecting apparatus of the present invention is capable of easily detecting and removing stalls while the detecting object remaining a source program, thereby improving program developing efficiency.

This apparatus may have a function of displaying a source program and an image of pipeline stages with detected stall information being related to the displayed program and pipeline image.

To realize this function, the apparatus of FIG. 2 further has an image creator 205 for creating a pipeline image to show the state of each pipeline stages and an image display controller 106 for emphasizing stall locations in the source program and the corresponding pipeline image according to the stall information provided by the stall detector 204.

The image creator 205 creates an pipeline image information that indicate the states of the instructions contained in the source program in pipeline stages.

The image display controller 106 displays the source program and the pipeline image. At this time, the image display controller 106 emphasizes stall locations in the source program and the pipeline image according to the stall information, to call user's attention.

As a result, the user may quickly correct and remove the stalls from the source program. On the displayed source program and pipeline image, the user may instantaneously confirm whether or not the stalls have been removed from the source program by correcting the source program. This improves program developing efficiency.

A way of displaying stall information may flexibly be modified according to the described contents of a source program and stall occurring situations.

For example, the user may enter instructions to enable or disable conditional branch Instructions or the number of enabling times of a given conditional branch instruction to optionally settle the process after the conditional branch Instruction.

If plural stalls simultaneously occur, one of the stalls having the largest number of stall cycles may be emphasized to indicate a major bottleneck location.

If stalls successively occur, they may uniformly be emphasized.

The stall detecting apparatus may display a menu to let the user optionally select stall information to display. To call user's attention, stall locations in the displayed source program and pipeline image may be emphasized by highlighting, coloring, underlining, using a different font, blinking, indicating with arrows, or properly combining them.

A second aspect of the present invention statically analyzes a source program according to an execution history of the program provided by, for example, a simulator and detects stalls according to a result of the analysis.

An example of an apparatus that realizes the second aspect of the present invention is shown in FIG. 17.

This apparatus detects stalls to occur in the pipeline processing of a source program. The apparatus has a file controller 101 for reading a history of simulated execution of a source program from a simulator, an text interpreter 202 for interpreting the read execution history of the source program on the basis of processor specifications, an Instruction developing unit 203 for developing the source program into states in pipeline stages of the pipeline processing according to the interpreted execution history of the source program, and a stall detector 204 for detecting stalls to occur during the pipeline processing of the source program according to the states of the source program developed in the pipeline stages and preparing stall information representing the detected stalls.

The file controller 101 reads a history of simulated execution of a source program.

The text interpreter 202 interprets the execution history of the source program according to the information obtained by simulated execution of the source file and processor specifications.

The apparatus of the second aspect is capable of detecting not only stalls detectable on a source program but also stalls detectable only from information that is obtainable by actually executing instructions of the source program by microprocessor. Such information includes the destination of a conditional branch instruction and values stored in registers.

In this way, the second aspect detects many stalls to actually occur, thereby improving program developing efficiency.

In formation obtainable from the history 6 of simulated execution of a source program includes the number of instructions executed through simulations and the number of clock cycles needed for executing the instructions. If the execution of the program is cancelled midway, the number of clock cycles to cancel may be added to the number of the executing clock cycles, and the sum may be displayed together with the pipeline image. If the pipeline image is not needed to display, the displaying of the pipeline image may be selectable and switchable.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIG. 13 shows a screen displaying successive stalls caused by a resource hazard;

FIG. 14 shows a screen displaying a pipeline image of simultaneously executed instructions whose pipeline stages exceed basic pipeline stages;

DETAILED DESCRIPTION OF THE EMBODIMENTS

Figure 1:
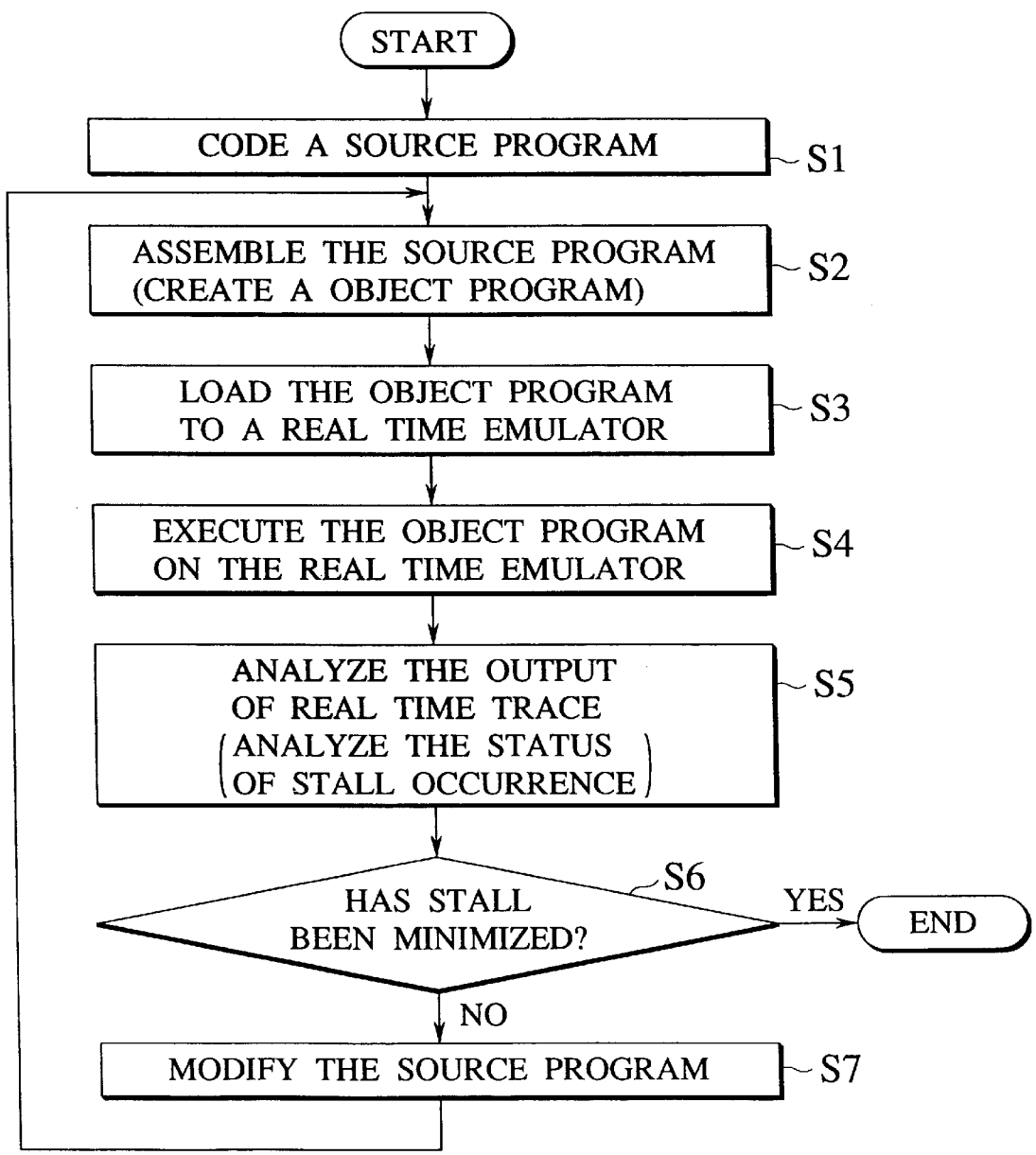
FIG. 1 is a flowchart showing the steps of detecting stalls in a source program and correcting the source program, according to a related art.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

1. First embodiment

A stall detecting apparatus, a stall detecting method, and a computer-readable medium containing a stall detecting program according to a first embodiment of the present invention will be explained in detail with reference to the drawings.

The first embodiment is characterized by statically analyzing an assembler source program with an editor, so as to detect stalls to occur in the assembler source program, and displaying the assembler source program and a corresponding pipeline image with stall locations being emphasized according to the interpretation of the assembler source program.

Figure 2:
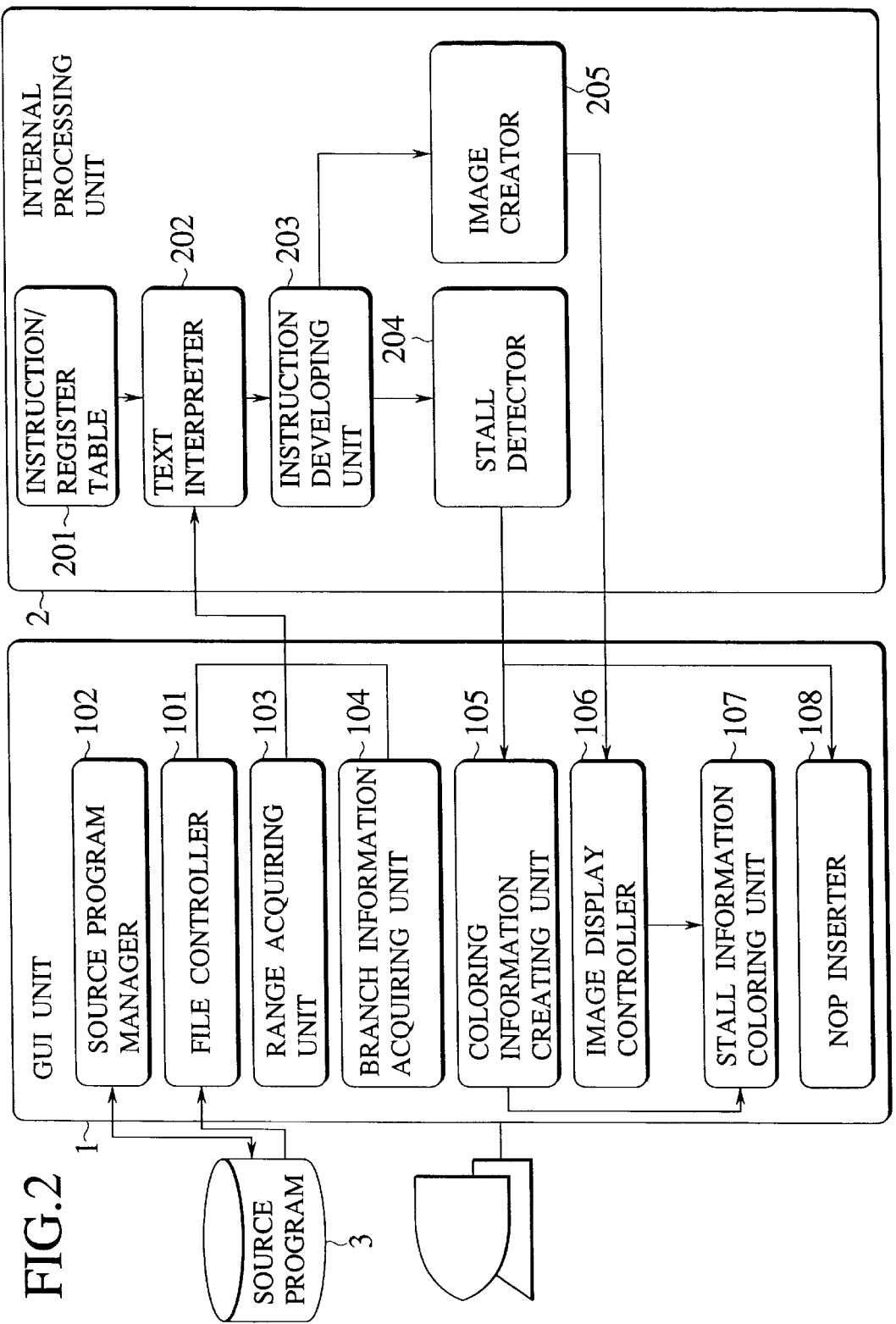
FIG. 2 is a block diagram, showing functional configuration of a stall detecting apparatus according to a first embodiment of the present invention.

FIG. 2 is a block diagram showing functional configuration of the stall detecting apparatus of the first embodiment.

The apparatus has a GUI unit 1 and an internal processing unit 2.

The GUI unit 1 controls a user interface. The GUI unit 1 has a file controller 101, a source program manager 102, a range acquiring unit 103, a branch information acquiring unit 104, a coloring information creating unit 105, an image display controller 106, a stall information coloring unit 107, and a NOP inserter 108.

The file controller 10 1 reads a source program 3 from a file and transfers text strings of the source program to the internal processing unit 2. The source program manager 102 manages, edits, and saves the source program for the stall detecting apparatus. The range acquiring unit 103 acquires a stall detecting range in the read source program according to data entered by the user. From the acquired range, the range acquiring unit 103 retrieves text strings from the file controller 101 and transfers them to the internal processing unit 2. The branch information acquiring unit 104 acquires, from data entered by the user, control information for each conditional branch instruction contained in the source program, to determine whether or not the branch instruction must be enabled. The acquired information and the text strings of the source program are transferred to the internal processing unit 2. The coloring information creating unit 105 creates coloring information for the text strings of the source program and a pipeline image according to stall information from the internal processing unit 2. The image display controller 106 displays the source program and pipeline image provided by the internal processing unit 2. The stall information coloring unit 107 colors the source program texts and pipeline image according to the coloring information provided by the coloring information creating unit 105.

The coloring information is used to emphasize specific parts of displayed images. In the following explanation, the coloring information is any information used to emphasize a given field more than other fields, to call user's attention. For example, the coloring information may color, highlight, reverse, blink, or use a different font for specific fields of displayed images.

The NOP inserter 108 inserts a NOP (no-operation) instruction into every cycle of each detected stall in the source program.

The internal processing unit 2 detects stalls in the source program. The internal processing unit 2 has an instruction/register table 201, an text interpreter 202, an instruction developing unit 203, a stall detector 204, and an image creator 205.

The instruction/register table 201 stores hazard information that is used to find stall occurrence of instructions appearing in source programs in connection with microprocessor specifications. More precisely, the instruction/register table 201 holds, for each instruction used by microprocessors, the type of the instruction(e.g., whether or not the instruction is a conditional branch instruction), the number of source registers relating to the instruction, the number of destination registers relating to the instruction, a possibility of the instruction of causing a data or resource hazard that may cause a stall, the number of pipeline stages necessary for executing the instruction, etc.

The text interpreter 202 receives a line of text strings of the source program from the GUI unit 1 and retrieves corresponding hazard information from the instruction/register table 201. The hazard information is required to develop the text line into pipeline stages. The hazard information may include the number of pipeline stages needed for executing a given instruction and whether or not the instruction may cause a hazard. The instruction developing unit 203 develops the line of the source program into pipeline stages according to the hazard information that correspond to one line of the source program provided by the text interpreter 202. The stall detector 204 detects any location where a stall, i.e., pipeline delay occurs according to the states of the pipeline stages provided by the instruction developing unit 203. If any stall is detected at this time, the stall detector 204 prepares stall information about the stall and provides the GUI unit 1 with the stall information.

The image creator 205 creates image information for displaying an image of the pipeline stages provided by the instruction developing unit 203 and provides the GUI unit 1 with the image information.

Figure 3:
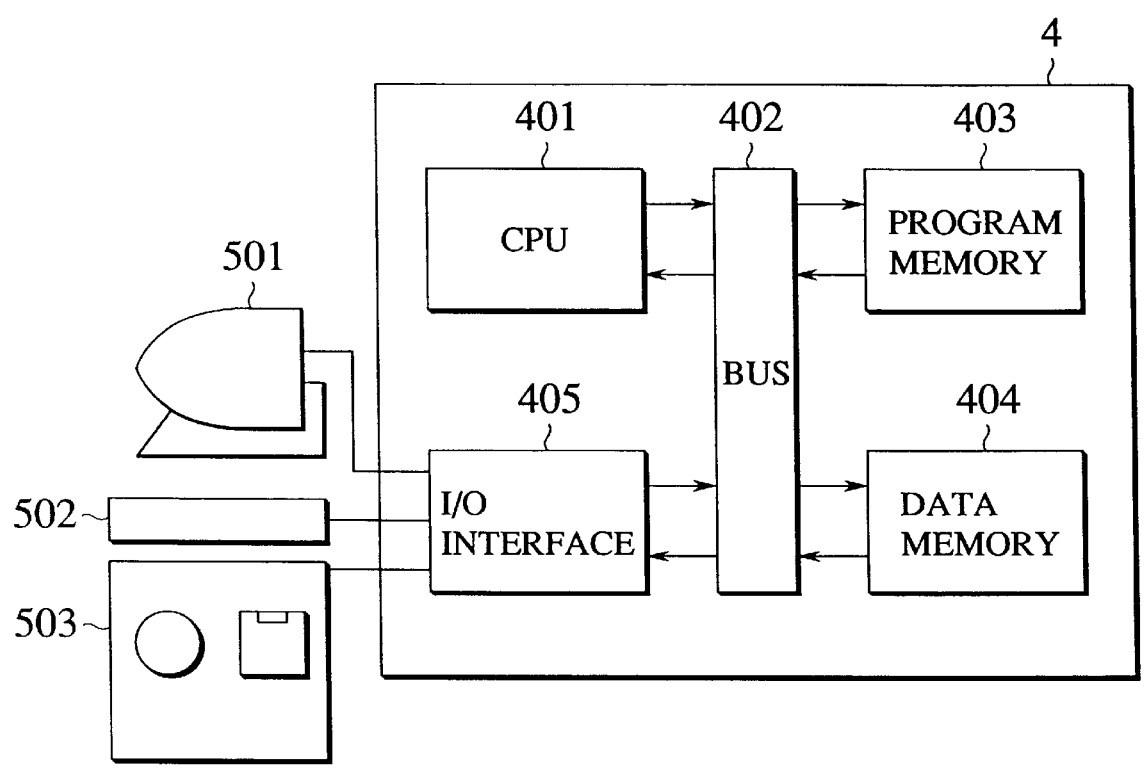
FIG. 3 shows a hardware structure of the stall detecting apparatus of the present invention.

A hardware configuration for realizing the stall detecting apparatus and stall detecting method of the first embodiment will be explained with reference to FIG. 3.

The stall detecting apparatus of the first embodiment is realized with a standard computer system that may include an input unit 502 such as a keyboard and mouse, an output unit 501 such as a display and printer, a CPU 401 for controlling resources and carrying out various operating and transferring processes in response to instructions, a program memory 403 for storing instructions to be executed, a data memory 404 for storing data used for processes, an I/O interface 405, and a recording medium 503 such as an FD and CD.

The CPU 401 is connected to the program memory 403 and data memory 404 through a bus 402. The CPU 401 specifies an address in the program memory 403, reads instruction codes at the address, and decodes the instruction codes. Based on the decoded instruction codes, the CPU 401 specifies addresses in the data memory 404, reads necessary data at the addresses, and uses the data for processes.

Results of the processes are sent to the output unit 501 through the I/O interface 405.

A program to realize the stall detecting method of the present invention may be stored in the recording medium 503 that is readable by computer. The recording medium 503 is read by computer, and the user properly controls the computer to run the program and achieve the stall detecting method mentioned above. The recording medium 503 may be a memory, magnetic disk, optical disk, or any other medium capable of recording programs.

The details of the processes of the first embodiment will be explained with reference to the drawings.

Figure 4:
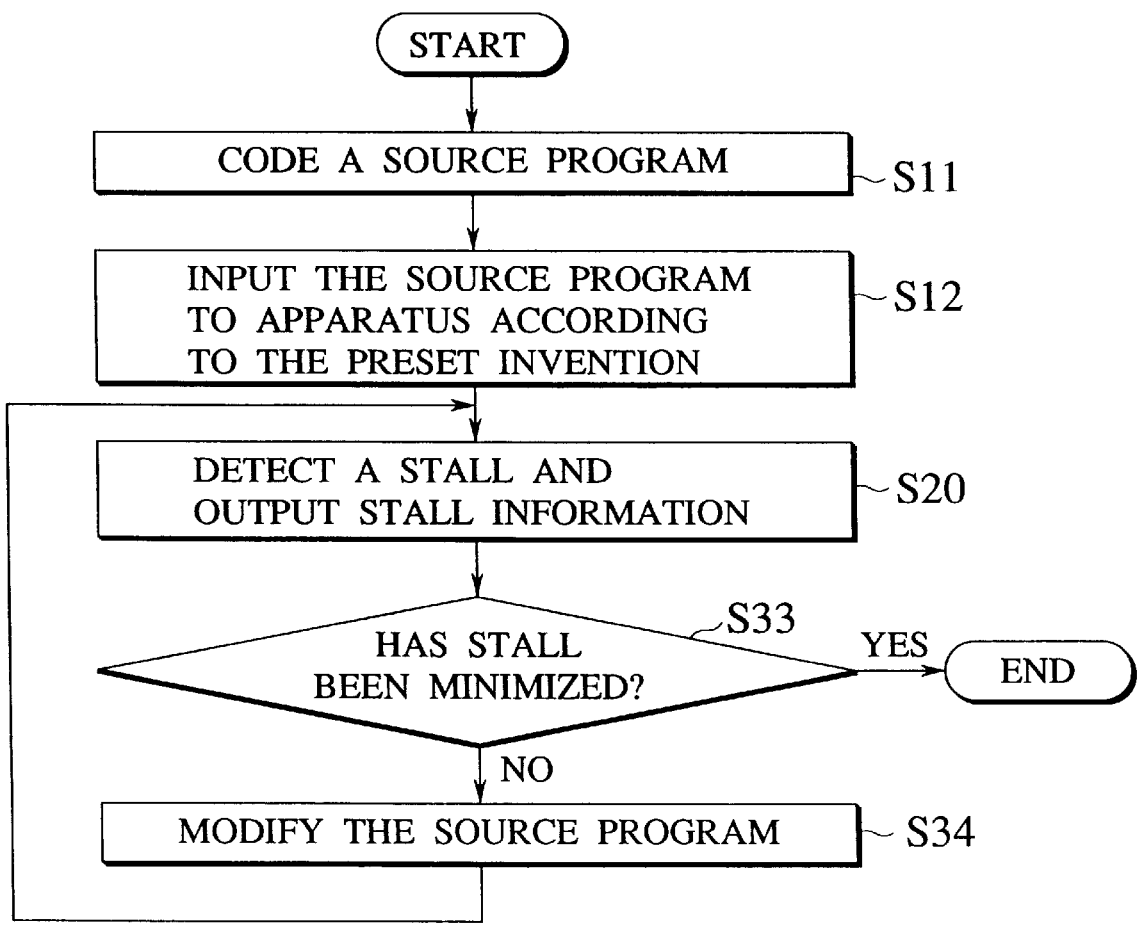
FIG. 4 is a flowchart showing the steps of realizing stalls in a source program and correcting the source program, according to an embodiment of the present invention.

First, the steps of detecting stalls in a source program and correcting the source program according to the first embodiment will be explained with reference to a flowchart of FIG. 4.

Step S11 prepares a source program for a microprocessor. Step S12 loads the source program on the stall detecting apparatus of the first embodiment. The apparatus detects stalls in the source program and provides stall information in step S20. According to the stall information, step S33 determines whether or not stall occurrence has been minimized with respect to a performance level to be needed. The user corrects the source program in step S34, and the stall detection is repeated until step S33 determines that stall occurrence has been minimized.

Figure 5:
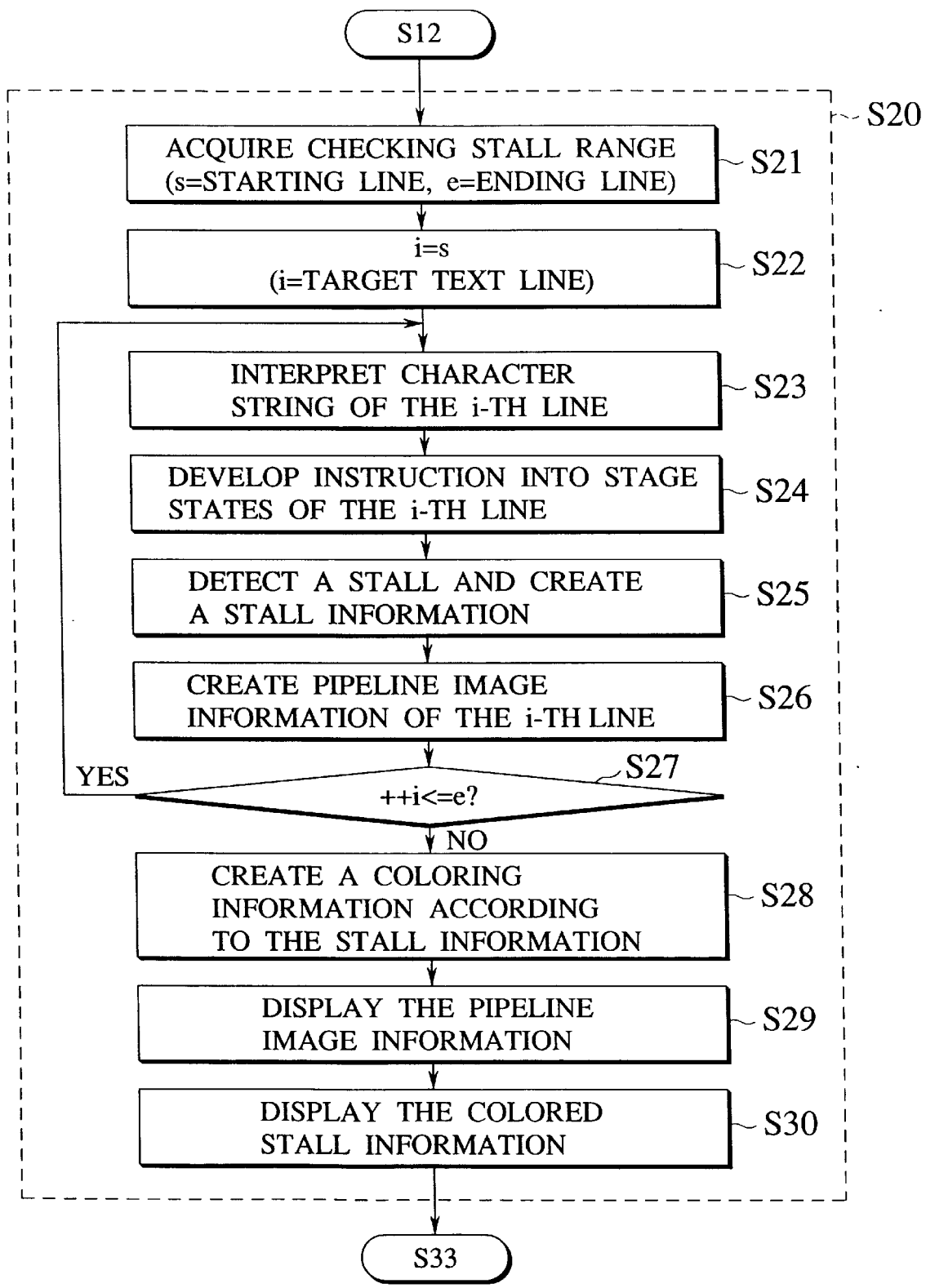
FIG. 5 is a flowchart showing the details of a stall detecting step of FIG. 4.

The details of step S20 of detecting stalls will be explained with reference to a flowchart of FIG. 5.

Step S21 reads the source program and acquires a stall detecting range of the source program according to data entered by the user. In the following explanation, "s" represents a start line, "e" an end line, and "i" a target line of the stall detecting range. Steps S22 and S23 interpret character strings in the target line "i" among the stall detecting range. Step S24 develops the interpreted line "i" into pipeline stages of pipeline processing.

Step S25 checks the states of the pipeline stages for stalls and prepares stall information. Step S26 prepares pipeline image information for the line "i." Step S27 repeats steps S23 to S26 for every instruction line contained in the stall detecting range.

Once the stall information and image information are prepared for every instruction line of the stall detecting range, step S28 creates stall coloring information for stall locations.

Step S29 displays the source program and a pipeline image. Step S30 colors the stall locations in the displayed source program and pipeline image.

An example of screens to display the source program and pipeline image according to the first embodiment will be explained.

Figure 6:
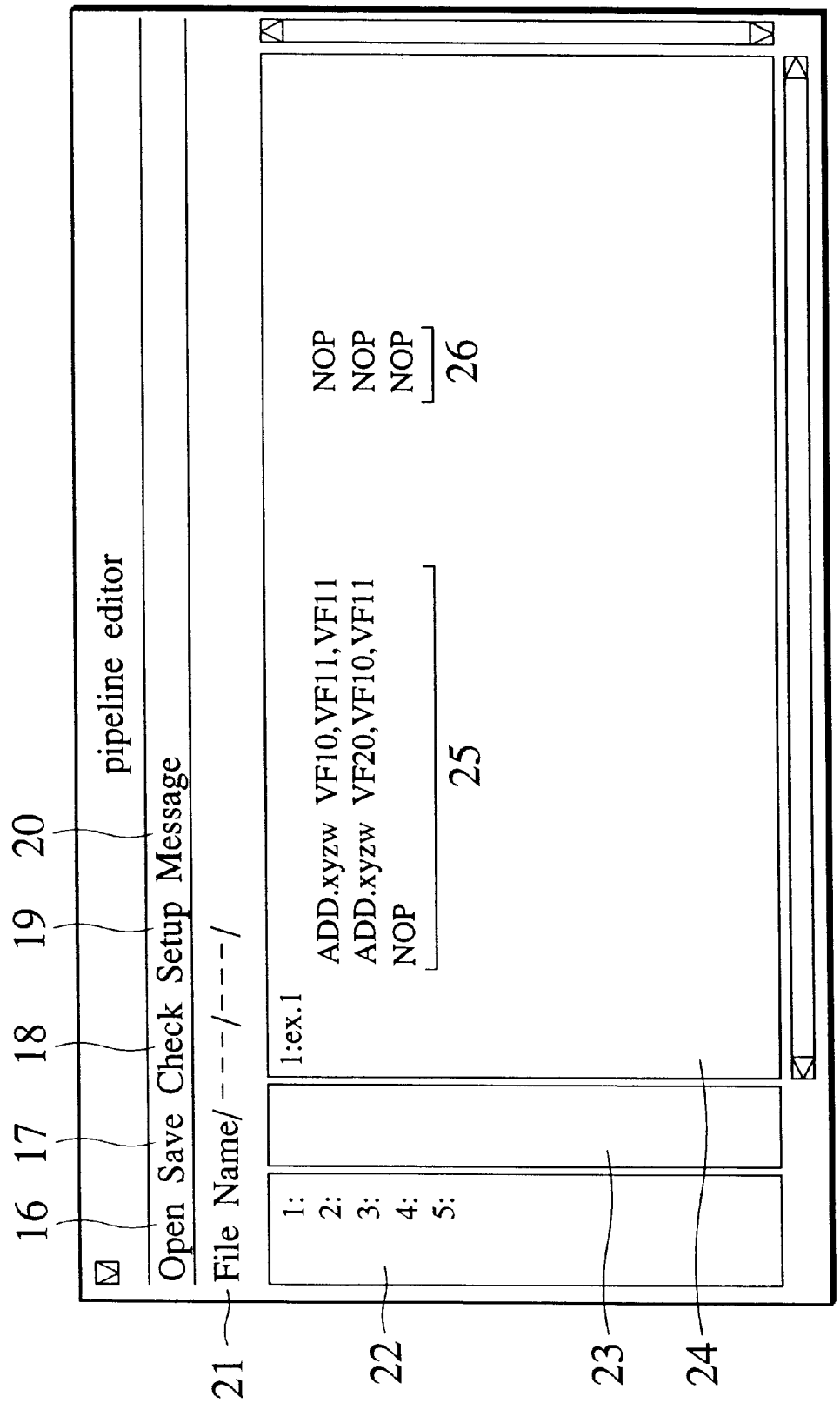
FIG. 6 shows a basic screen according to the first embodiment of the present invention.

FIG. 6 shows a basic screen.

The basic screen displays a button 16 for reading a file, a button 17 for saving a file, a button 18 for starting stall detection, a button 19 for initialization, and a button 20 for opening a message window for, for example, an error message. The basic screen also displays a field 21 for displaying the name of a read file, a field 22 for displaying line numbers of the read file, a field 23 for specifying the number of enabling times of a conditional branch instruction, and a window 24 for displaying the contents of the read file, i.e., a source program.

The first embodiment is based on a microprocessor employing two-way VLIW instruction type. Accordingly, instruction codes of the read file are displayed in two sections, i.e., an upper instruction section 25 and a lower instruction section 26.

A stall detecting operation according to the first embodiment will be explained. The user clicks the button 16 to display a control panel for reading a file. The user selects a file on the panel, or inputs a file name, to determine a file to read and check for stalls. Once the file is read, the field 21 displays the name of the file, the field 22 line numbers of the file, and the window 24 the contents of the file.

The user clicks the button 18 to open a menu to specify a stall detecting range. If the user selects the whole of the file, the file is checked for stalls from the beginning to the end thereof. If any stall is detected, a location where the stall occurs is colored in the window 24.

Screens for displaying stall information and a pipeline image will be explained for various cases.

(1) Data hazard (registe r hazard)

A case when a stall occurs due to a data hazard will be explained with reference to screens shown in FIGS. 7 and 8.

Figure 7:
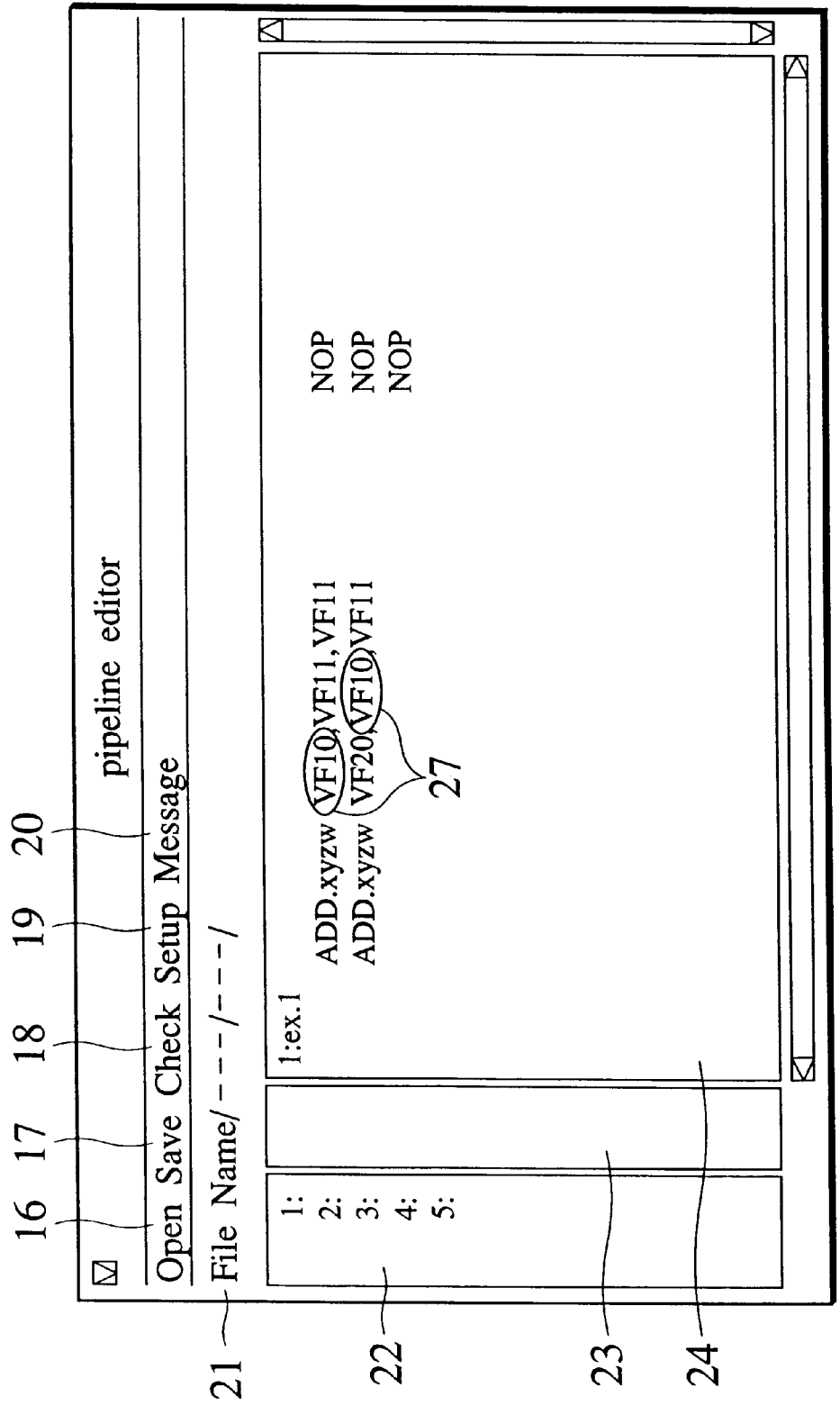
FIG. 7 shows a screen displaying a result of stall detection according to the first embodiment.

In FIG. 7, each location 27 is colored to indicate that a stall occurs on VF10 in the second line and VF10 in the third line. The stall may be emphasized not only by coloring but also by highlighting, underlining, using a specific font (a bold font), blinking, reversing, a combination thereof, or any means to call user's attention.

Figure 8:
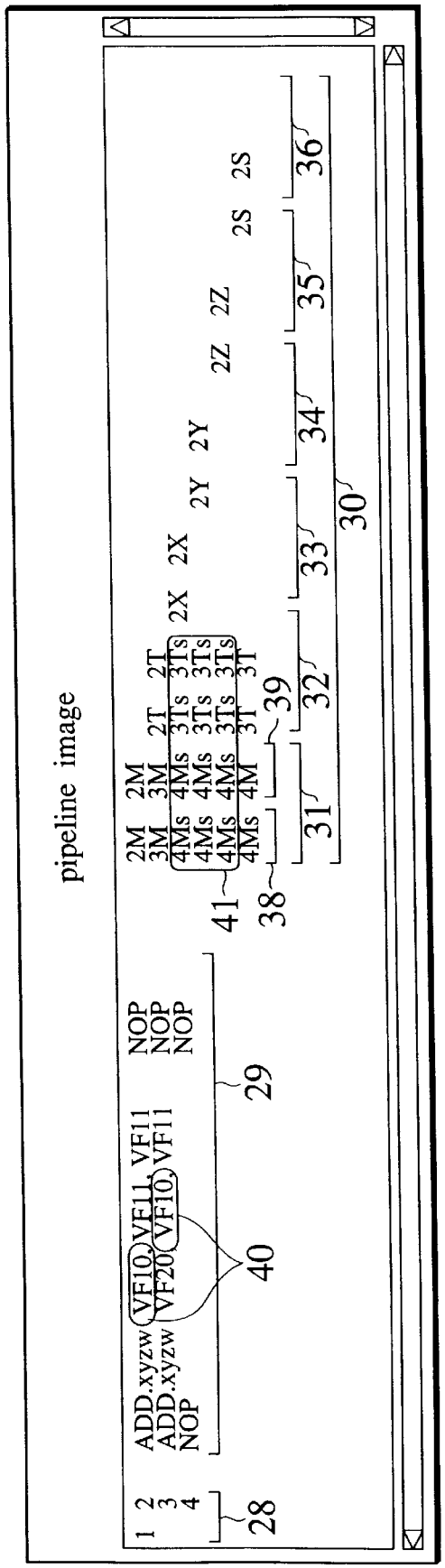
FIG. 8 shows a screen displaying a pipeline image after stall detection according to the first embodiment.

The screen of FIG. 8 displays a pipeline image f or pipeline-processing the displayed part of the source program as well as the contents of a stall detecting range of the source program. Displayed in the same screen are a section 28 for line numbers of the read file, a section 29 for the contents of the file corresponding to the lines numbers, and a section 30 for the pipeline image corresponding to the file contents of the section 29.

It is assumed that the first embodiment is based on a co-processor that uses six basic pipeline stages for processing instructions. With the use of the instruction/register table 201 for holding hazard information corresponding to processor specifications, the present invention is capable of handling a variety of processors. The source file of this example is prepared for the processor that involves six basic pipeline stages for processing instructions, and the source file is read and checked for stalls.

The pipeline image section 30 shows the six pipeline stages arranged side by side. The six pipeline stages include an M-stage 31, a T-stage 32, an X-stage 33, a Y-stage 34, a Z-stage 35, and an S-stage 36. Each stage consists of an upper instruction section 38 and a lower instruction section 39. It is assumed that the processor specifications of the first embodiment limit stages that may cause stalls to the H- and T-stages 31 and 32 that carry out a fetching process. If the H- or T-stage causes a stall, as shown in FIG. 8, it is displayed with a suffix "s." Each stall location 40 in the section 29 and a corresponding stall location 41 in the pipeline image section 30 are colored with the same color to emphasize them.

Further, the first embodiment may employ the NOP inserter 108 to automatically insert a NOP (no-operation) instruction into every cycle of each detected stall in the source program. Inserting NOP instructions enables the user to easily correct stall locations in the source program.

After the source program is corrected for the stalls, the stall locations may be returned to a normal color for the sake of user's convenience.

(2) Simultaneous stalls

A case when stalls occur simultaneously due to hazards will be explained with reference to screens shown in FIGS. 9 and 10.

If stalls occur simultaneously, the first embodiment emphasizes a location where a stall having the largest number of clocks necessary for conclusion of the stall (hereinafter "stall cycle") occurs among the simultaneously occurring stalls.

Figure 9:
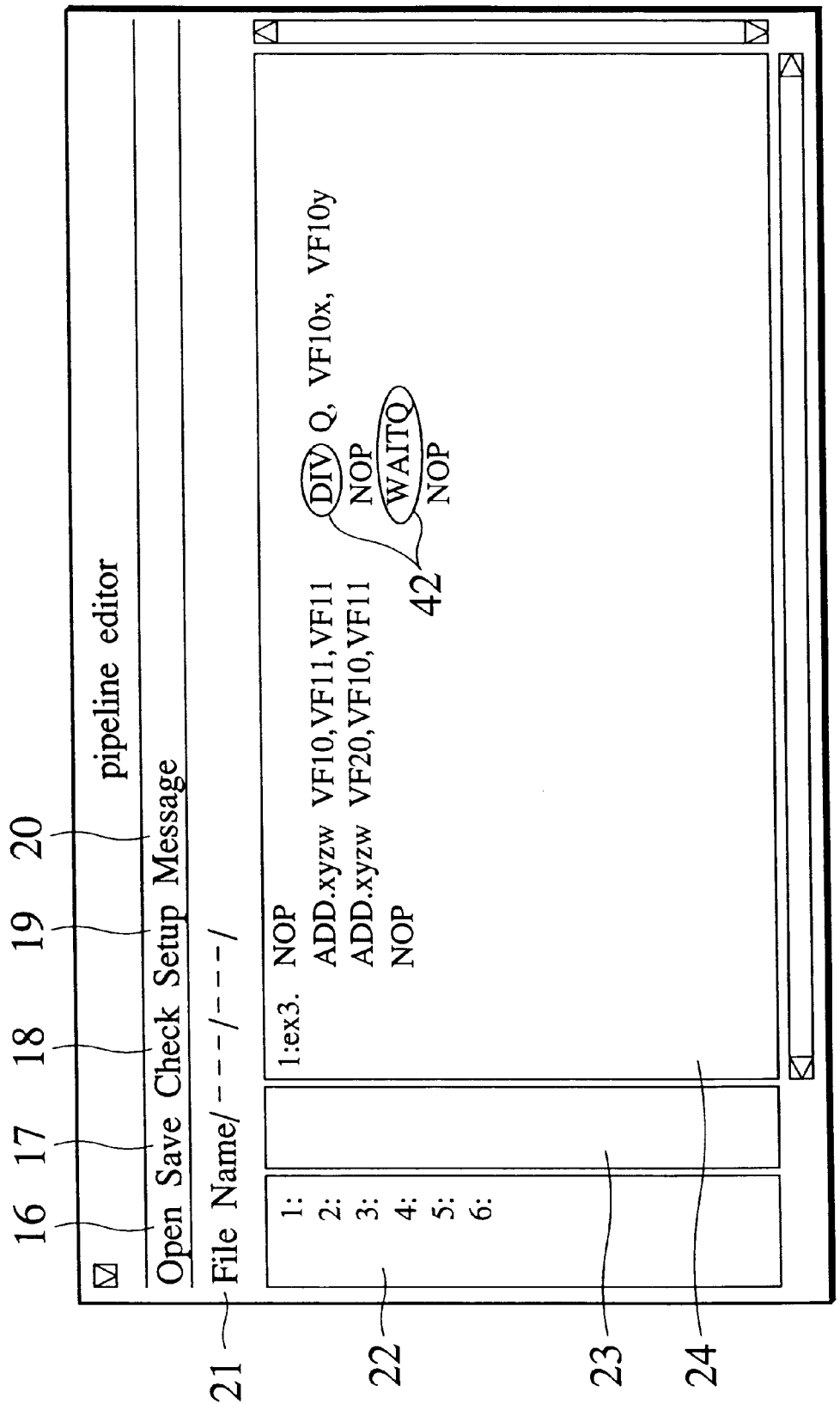
FIG. 9 shows a screen displaying simultaneously occurring stalls.

The screen of FIG. 9 displays a result of stall detection carried out on the read source file. Only a part 42 is colored as a stall location.

Figure 10:
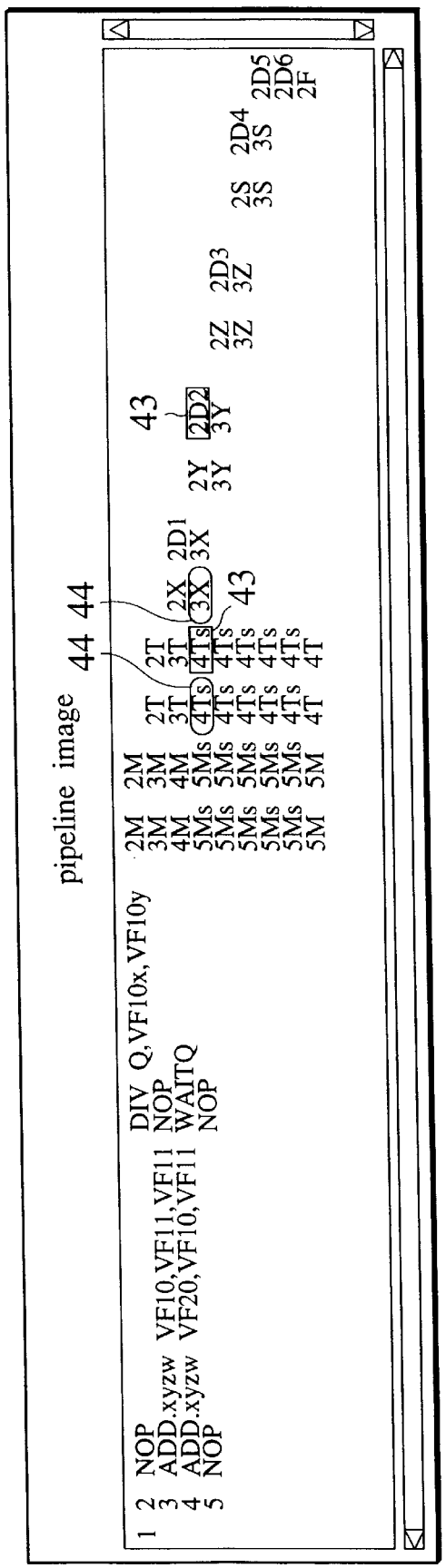
FIG. 10 shows a screen displaying simultaneously occurring stalls and a corresponding pipeline image.

However, a pipeline image of FIG. 10 displaying the same part as FIG. 9 shows not only a stall 43 corresponding to the stall 42 of FIG. 9 but also a stall 44. This stall 44 is not colored because the number of stall cycles thereof is smaller than that of the stall 43. This will be explained in more detail.

The stall 44 is caused by an ADD instruction due to a data hazard. This hazard dissolves in the S-stage. Accordingly, the number of stall cycles of the stall 44 is three in which the processing of an instruction in the third line reaches the S-stage. On the other hand, the stall 43 is due to a resource hazard, which dissolves when a corresponding process reaches the F-stage. Accordingly, the number of stall cycles of the stall 43 is five in which an instruction in the second line reaches the F-stage. As a result, the number of stall cycles of the stall 43 is larger than that of the stall 44 by two. Then, the first embodiment colors only the location 42 of FIG. 9, i.e., the location 43 of FIG. 10.

Since a stall having the largest number of stall cycles is colored and displayed, the user may easily recognize a major cause that deteriorates program execution efficiency.

(3) Stall sources of the same stall cycles for one instruction

A case when an instruction involves stall sources having the same stall cycles will be explained with reference to a screen shown in FIG. 11.

If an instruction involves stall sources of the same stall cycles, the first embodiment identifies a first one of the stall sources according to instruction specifications and colors only the first stall source. The first stall source is a stall source that appears first in a given instruction text line of the read source file. For example, a first operand appears before a second operand according to instruction specifications.

Figure 11:
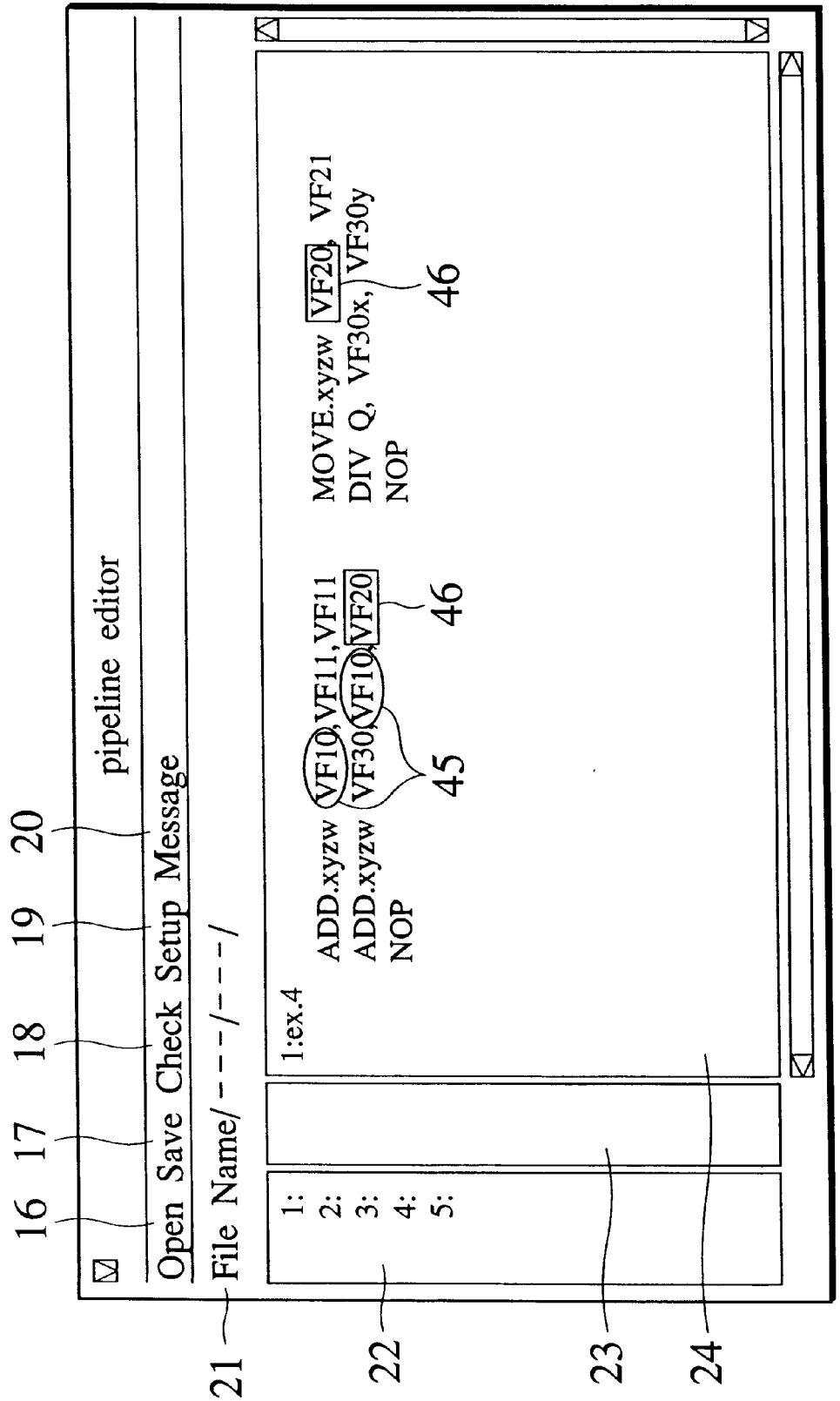
FIG. 11 shows a screen displaying instructions that involves plural stall sources having the same number of stall cycles.

The screen of FIG. 11 displays a result of stall detection carried out on the read source file. Only a location 45 is colored as a stall. A location 46 also causes a stall whose number of stall cycles is the sgame as that of the stall 45. These two stalls are caused by ADD instructions. In this case, VF10 that appears first according to instruction specifications is colored, and VF20 is not colored. This technique clearly indicates the stall source that must be solved first.

A modification of the case (3) according to the first embodiment will be explained with reference to a screen shown in FIG. 12.

If an instruction involves stall sources of the same stall cycles, this modification colors stall stages in a pipeline image with the same color as that for a first stall source.

Figure 12:
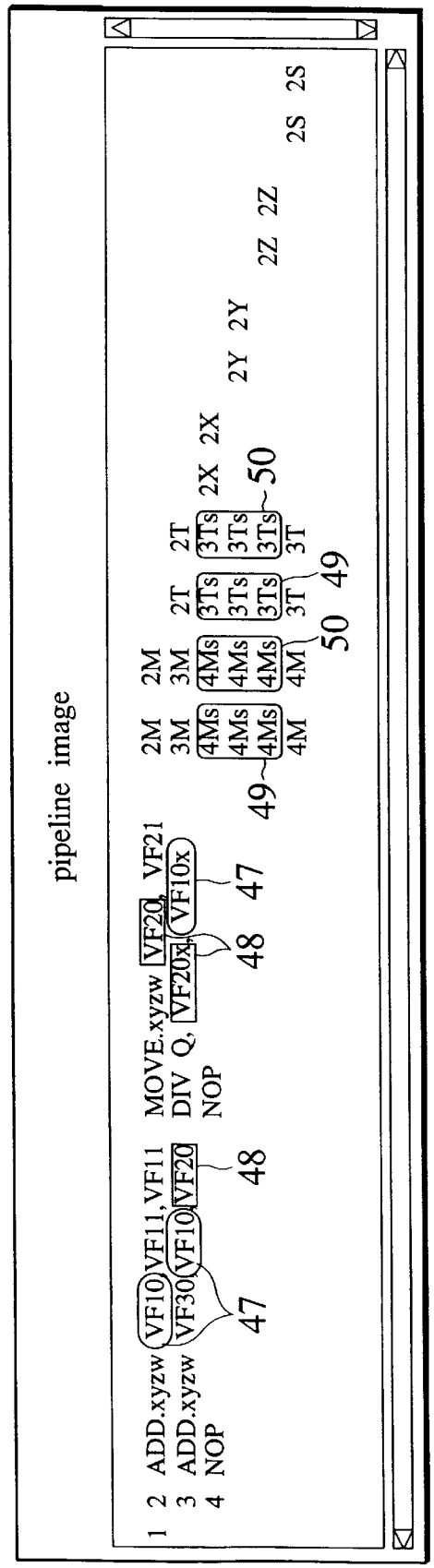
FIG. 12 shows a screen displaying an instruction that involves stall sources having the same number of stall cycles and a corresponding pipeline image.

The screen of FIG. 12 displays the source file and pipeline image as a result of stall detection carried out on the read source file. A location 47 corresponding to VF10 in the second and third lines, and a location 48 corresponding to VF20 in the second and third lines simultaneously cause stalls. As a result, the two source registers in each of the upper and lower instruction sections in the third line are differently colored. In this case, a first stall source (i.e., register) according to instruction specifications is colored, and this color is used to color stall stages in the pipeline image. Namely, a stage location 49 corresponding to VF10 of the upper instruction section, and a stage location 50 corresponding to VF20 of the lower instruction section are colored with that same color.

Although this example colors and displays only a first one of stall sources according to instruction specifications, it is possible to differently color (or apply another emphatic displaying to) the other of stall sources.

The stall sources, which may be colored or not, may be displayed in a menu so that the user may select one or more of them to display related stall information.

(4) Successive resource hazards

A case when stalls successively occur due to resource hazards will be explained with reference to a screen shown in FIG. 13.

If stalls successively occur due to resource hazards, the first embodiment uniformly colors an instruction that causes a first resource hazard to an instruction that causes a last resource hazard.

Successive stalls frequently occur when instructions that involve many pipeline stages.

The screen of FIG. 13 displays a result of stall detection carried out on the read source file. Instructions that may cause a resource hazard are, according to processor specifications, DIV, SQRT, RSQRT, and WAITQ instructions. A result of the stall detection tells that an interval 51 between a DIV instruction in the second line and a SQRT instruction in the third line, an interval 52 between the SQRT instruction in the third line and an RSQRT instruction in the fourth line, and an interval 53 between the RSQRT instruction in the fourth line and a WAITQ instruction in the fifth line cause each a stall.

The SQRT instruction in the third line and the RSQRT instruction in the fourth line overlap, and therefore, the DIV instruction in the second line, SQRT instruction in the third line, SQRT instruction in the fourth line, and WAITQ instruction in the fifth line cause successive resource hazards. In this case, all of them are colored with the same color. Namely, the DIV, SQRT, RSQRT, and WAITQ instructions in the second to fifth lines are colored with the same color.

(5) Instructions involving stages greater than basic pipeline stages

A case when an instruction involving stages greater than the basic pipeline stages is executed will be explained with reference to a screen shown in FIG. 14.

If an instruction whose number of pipeline stages is greater than the number of the basic pipeline stages is executed, the first embodiment displays the excess stages on the right side of the basic pipeline stages in a pipeline image without shifting the excess stages sideward as the stages advance. If instructions each having pipeline stages whose number is greater than the number of the basic pipeline stages are successively executed, the first embodiment displays the excess stages for the processing instruction on the right side of the all pipeline stages in a pipeline image without shifting the excess stages sideward as the stages advance.

The screen of FIG. 14 displays a pipeline image showing a result of stall detection carried out on the read source file.

In FIG. 14, a section 54 in the pipeline image contains the basic pipeline stages. The section 54 is shifted to the left as the basic pipeline stages advance. DIV instructions in the second, 10th, and 17th lines and an ELENG instruction in the ninth line are instructions whose number of stages is greater than that of the basic pipeline stages. The displaying of these instructions will be explained. The excessive stages of the DIV instruction in the second line are displayed along the right boundary of the basic pipeline stages as indicated with 55 without being shifted sideward as the excessive stages advance. Similarly, the excessive stages of the DIV instruction in the 10th line are displayed as indicated with 56, and those of the DIV instruction in the 17th line are displayed as indicated with 58. Before the completion of the processing of the ELENG instruction, the processing of the DIV instruction in the 10th line starts, and therefore, the excessive stages of the ELENG instruction are displayed as indicated with 57 on the right side of the excessive stages 56 of the DIV instruction of the 10th line, without being shifted sideward as the excessive stages advance.

(6) Conditional branch instruction

A case when a conditional branch instruction is interpreted will be explained with reference to screens shown in FIGS. 15 and 16.

When a conditional branch instruction in the source file is interpreted, the first embodiment enables the user to specify whether or not the instruction must be enabled.

To let the user enter an instruction to specify the settlement of the conditional branch instruction, the first embodiment may automatically scroll the screen to display the line that contains the conditional branch instruction at the top and point the instruction with an arrow to call user's attention.

Figure 15:
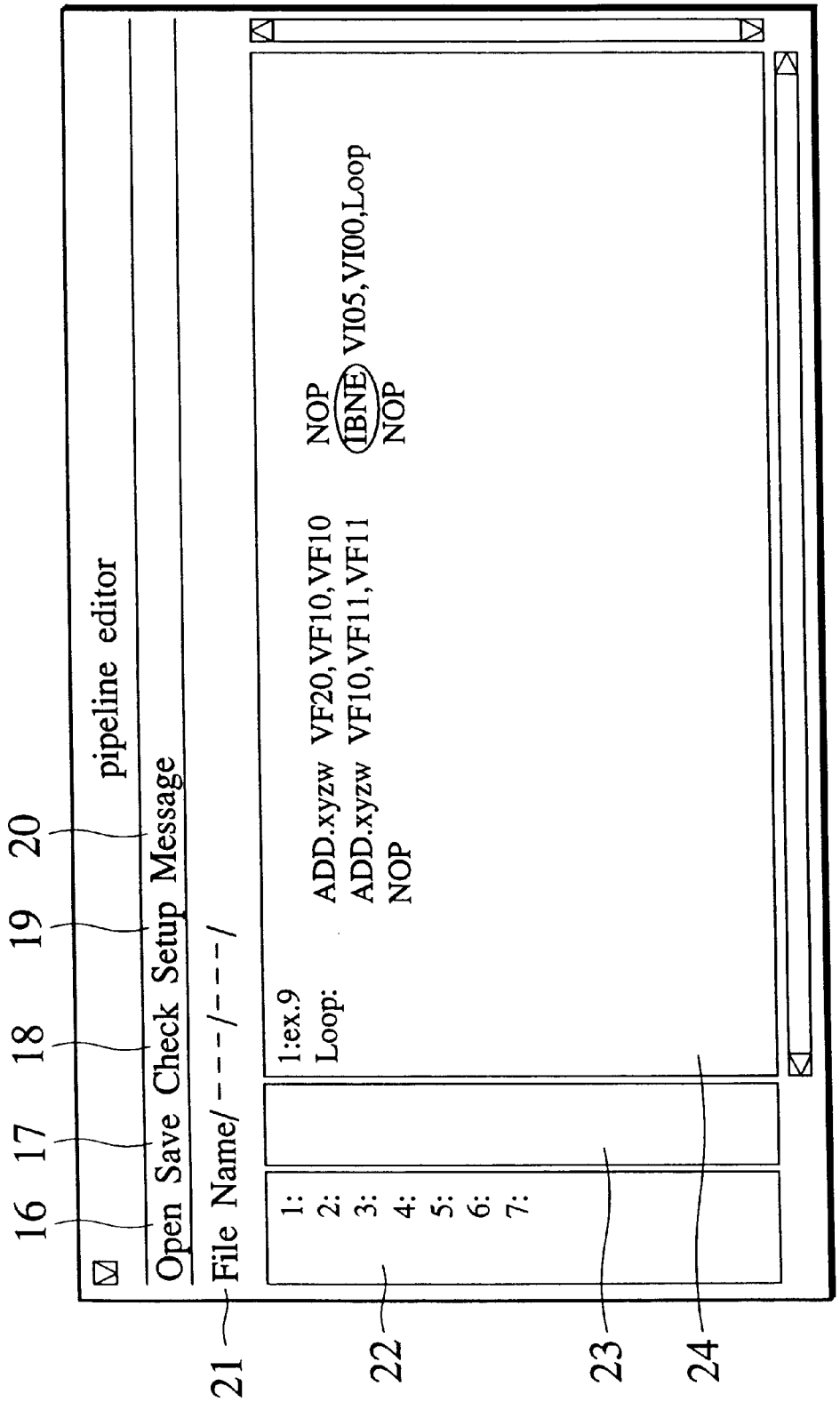
FIG. 15 shows a screen displaying an instructions that contains a conditional branch instruction.
Figure 16:
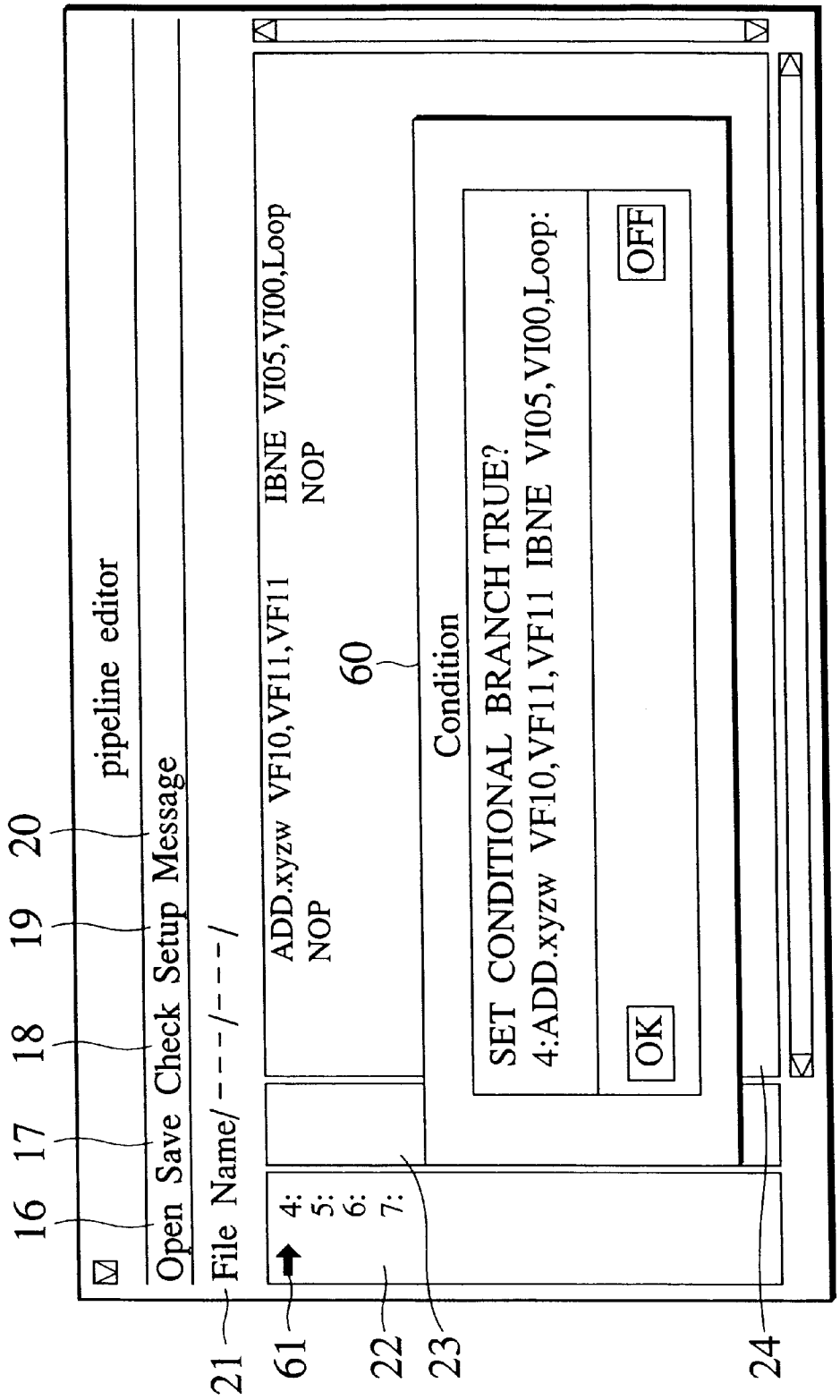
FIG. 16 shows a screen displaying a window for letting the user enter data for a conditional branch instruction.

The screen of FIG. 15 shows a conditional branch instruction contained in the read source file. The conditional branch instruction is an IBNE instruction 59. Stall detection is carried out on a stall detecting range of the source file. After the conditional branch instruction is interpreted, a window 60 of FIG. 16 pops up to let the user specify whether or not the instruction must be enabled. At this time, the text window 24 is automatically scrolled to bring the line that contains the conditional branch instruction to the top, and an arrow 61 points the line.

If the settlement of the conditional branch instruction is changed by the user, the image display controller 106 of the first embodiment may differently color stall locations detected before the change and stall locations detected after the change. The image display controller 106 may display all repetitions of a string of instructions that are executed after the conditional branch instruction is enabled, together with a corresponding pipeline image.

Although the source program of the first embodiment is written in assembler language, the present invention is applicable to source programs written in any high-level language. The present invention allows any combination of the display screens mentioned above.

As explained above, the first embodiment needs no assembling of source programs nor execution of object programs. The first embodiment requires no manual analysis of stalls. The first embodiment is capable of cooperative displaying detected stall source in a source file together with a source file and a pipeline image.

The first embodiment enables the user to code a source program in assembler language while detecting stalls in the program, observing the execution efficiency of the program, and correcting the program on a display.

Consequently, the first embodiment enables the user to easily create an assembler source program (e.g., assembler source program) that provides an object program of high execution efficiency.

2. Second embodiment

A stall detecting apparatus, a stall detecting method, and a computer-readable medium containing a stall detecting program according to a second embodiment of the present invention will be explained. Only the difference between the first and second embodiments will be explained in detail with reference to the drawings.

Compared with the function of the first embodiment, the second embodiment has a function of using a history of simulated execution of a source program to detect stalls that are detectable only by actual execution of the program, instead of using the text of the source program.

Figure 17:
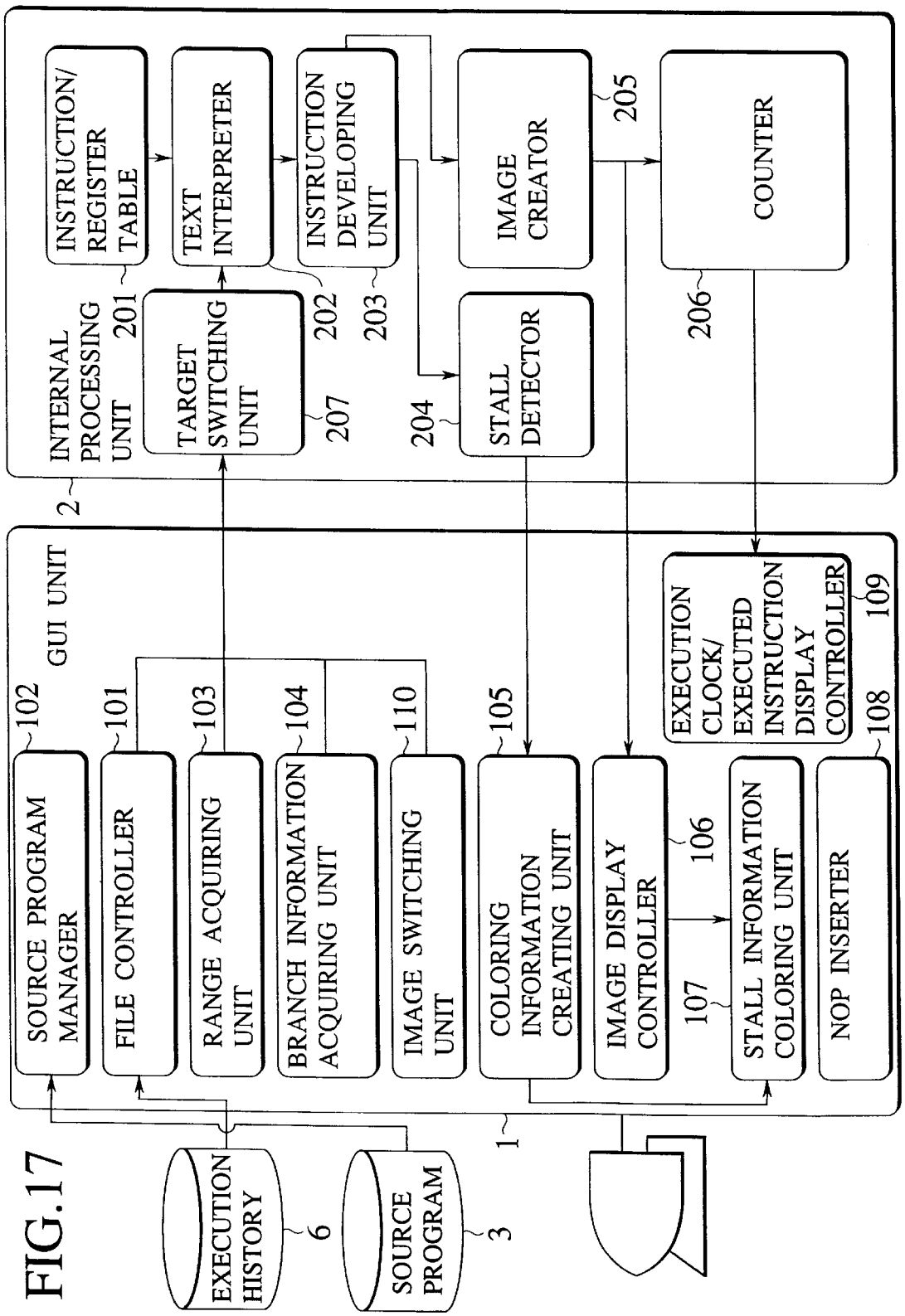
FIG. 17 is a block diagram showing functional configuration of a stall detecting apparatus according to a second embodiment of the present invention.

FIG. 17 shows the stall detecting apparatus according to the second embodiment. In addition to the components of the apparatus of the first embodiment, a GUI unit 1 of the second embodiment has an image switching unit 110 and a execution clock/executed instruction display controller 109. An internal processing unit 2 of the second embodiment additionally has a target switching unit 207 and a counter 206.

The image switching unit 110 displays a source program, and only when required, a pipeline image. To achieve this, the image switching unit 110 responds to an instruction entered by user to display or not a pipeline image.

A file controller 101 of the second embodiment receives an execution history file 6 from a simulator, instead of a source program file 3.

The target switching unit 207 switches a target to interpret by the text interpreter 202 between the source program file 3 and the execution history file 6. An text interpreter 202 interprets the target provided through the target switching unit 207.

The counter 206 counts the number of instructions executed within a stall detecting range determined by a range acquiring unit 103 and the number of clock cycles needed for executing the instructions and transfers the counted numbers to the execution clock/executed instruction display controller 109.

The execution clock/executed instruction display controller 109 displays the counted numbers of execution clock and executed instruction which provided through the counter 205 together with the source program and a pipeline image.

If the simulation of execution of the source program is cancelled midway, the number of clock cycles needed for canceling may be counted and added to the number of execution clock cycles so that the sum is displayed with a pipeline image in which the sum is reflected.

Figure 19:
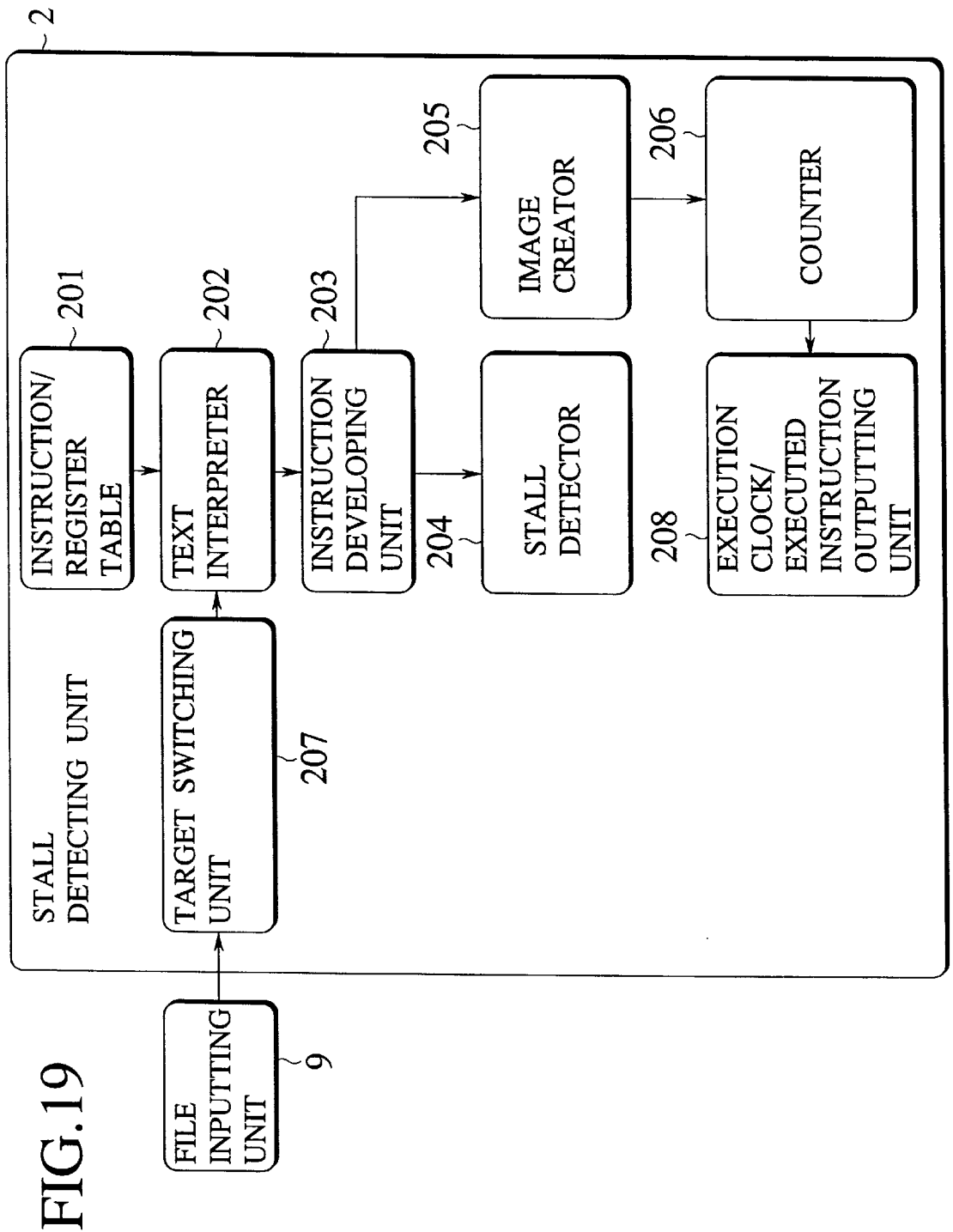
FIG. 19 is a block diagram showing functional configuration of a stall detecting apparatus according to a modification of the second embodiment.

FIG. 19 is a block diagram of functional configuration according to the second embodiment to cope with a case when an designation not to display a pipeline image is inputted to the image switching unit 110.

The designation not to display a pipeline image may be issued at optional timing. Usually, the designation is inputted when the stall detecting apparatus is activated. In this case, the stall detecting unit 2 collectively prepares stall information, pipeline image information, the number of execution clocks, and the number of executed instructions, and these information pieces are output to a file.

Instead of interactively correcting a source program on an editor while obtaining a stall information, the configuration of FIG. 19 is capable of providing required information such as stall information at high speed in the background processing.

Figure 18:
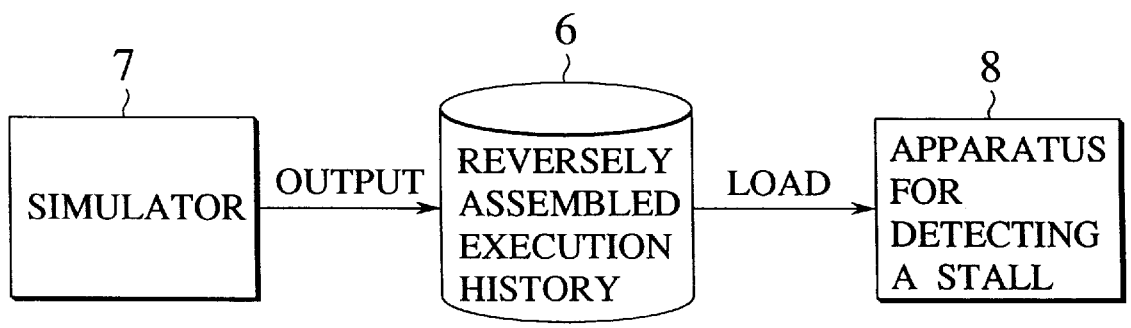
FIG. 18 shows relationships between a simulator and the stall detecting apparatus of the second embodiment.

As shown in FIG. 18, the execution history 6 loaded on the stall detecting apparatus is obtained by reversely assembling execution history of a source program outputted by a simulator 7 and by saving a result of the reverse assembling as a file. The execution history 6 usually includes text information about the source program, and therefore, it is possible to extract text strings of the source program from it.

The second embodiment may optionally be combined with the functions of the first embodiment.

A hardware configuration of the second embodiment is similar to that of the first embodiment, and therefore, will not be explained. The functions of the second embodiment except those explained above are the same as those of the first embodiment, and therefore, will not be explained.

As explained above, the second embodiment interprets a history of simulated execution of a source program. Therefore, in addition to the advantages of the first embodiment, the second embodiment is capable of detecting stalls according to information such as the destinations of conditional branch instructions and concrete data value stored in registers that are unobtainable unless a processor actually runs and executes the operations in the program.

Consequently, the second embodiment is capable of detecting many stalls that may actually occur.

In a summary, the present invention statically detects stall occurrence in a source program while the source program is being coded and displays the source program and a pipeline image of the pipeline processes of the source program with the detected stall source being emphasized in the displayed program and pipeline image.

Unlike the related art that must create an object program from a source program and execute the object program before detecting stalls in the source program, the present invention is capable of detecting stalls in a source program and correcting the source program immediately.

In other words, the present invention is capable of easily detecting stalls in a source program and correcting the source program to remove the stalls therefrom. This results in greatly reducing labor and time in developing source programs and improving program developing efficiency compared with the related art.

Various modifications will become possible for those skilled in the art after receiving the teachings of the present disclosure without departing from the scope thereof.

It is intended, therefore, that all matter contained in the foregoing description and in the drawings shall be interpreted as illustrative only not as limitative of the invention.

What is claimed is:

1. An apparatus for detecting and displaying stalls that occur during pipeline processing, comprising:

input portion for reading a source program;

interpreter for interpreting the read source program on the basis of processor specifications;

instruction developing unit for developing the interpreted source program into states in pipeline stages of the pipeline processing;

stall detector for detecting stalls in the pipeline processing according to the states of the source program developed in the pipeline stages and providing stall information representing the detected stalls;

pipeline image creator for creating a pipeline image to show the states of the source program, developed by the developing unit, in the pipeline stages; and display portion for concurrently displaying the source program and corresponding pipeline image and emphatically displaying in the source program and pipeline image, locations where the detected stalls occur according to the stall information provided by the stall detector.

2. The apparatus as claimed in claim 1, further comprising:

detecting range acquiring portion for acquiring a range of the read source program in which stalls are going to be detected.

3. The apparatus as claimed in claim 1, further comprising:

source program manager for editing and storing the read source program.

4. The apparatus as claimed in claim 1, further comprising no operation ("NOP") instruction inserter for inserting one or a plurality of NOP instructions into the source program, wherein a number of NOP instructions corresponds to the number of stall cycles of the detected stalls.

5. The apparatus as claimed in claim 1, wherein the display portion emphasizes a location corresponding to a stall having a largest number of stall cycles needed for dissolution among stalls detected to occur simultaneously.

6. The apparatus as claimed in claim 1, wherein the display portion emphasizes only a location corresponding to a first stall source according to instruction specifications, if an instruction involving stall sources of same stall cycles is detected.

7. The apparatus as claimed in claim 1, further comprising:

menu display portion for displaying a menu of stall locations corresponding to each stall source, which may be emphasized or not, and displaying the stall information provided by the stall detector according to a selection made through the menu and the stall information.

8. The apparatus as claimed in claim 1, wherein the display portion uniformly emphasizes all instructions that involve resource hazards that cause successive stalls.

9. The apparatus of claim 1, wherein the display portion includes:

a field for entering the number of times of enabling a conditional branch instruction.

10. The apparatus as claimed in claim 1, wherein, if the interpreted source program contains a conditional branch instruction, the display portion displays an instruction line that includes the conditional branch instruction, and prompts a user to determine whether or not the conditional branch instruction must be enabled.

11. The apparatus as claimed in claim 1, wherein, if one or a plurality of instructions that require more pipeline stages than preset basic pipeline stages are executed in parallel, the display portion displays, in the pipeline image, excess part of the pipeline stages of the instructions along a boundary of the basic pipeline stages orthogonally to a temporal advancing direction of the basic pipeline stages.

12. An apparatus for detecting and displaying stalls that occur during pipeline processing, comprising:

input portion for reading a history of simulated execution of a source program;

interpreter for interpreting the read history of simulated execution of the source program on the basis of processor specifications;

developing unit for developing the source program into pipeline states in stages of the pipeline processing according to the interpreted history of simulated execution of the source program;

stall detector for detecting stalls in the pipeline processing according to the states of the source program developed in the pipeline stages and providing stall information representing the detected stalls;

image creator for creating a pipeline image to show the states of the source program, developed by the developing unit, in the pipeline stages; and display portion for concurrently displaying the source program and corresponding pipeline image and emphatically displaying in both the source program and the corresponding pipeline image, locations where the detected stalls occur according to the stall information provided by the stall detector.

13. The apparatus as claimed in claim 12, further comprising:

a counter for counting the number of instructions executed by simulation and/or the number of clock cycles needed for executing the instructions according to the history; and wherein the display portion additionally displays the counted numbers of the executed instruction and/or the clock cycles.

14. The apparatus as claimed in claim 5, wherein the counter further counts a number of canceling clock cycles needed for canceling the execution of the source program; and the display portion displays the sum of the number of the executing clock cycles and the number of canceling clock cycles and/or the pipeline image that reflect the canceling clock cycles.

15. The apparatus as claimed in claim 12, further comprising:

image switching unit for selectively determining whether or not the pipeline image must be displayed.

16. The apparatus as claimed in claim 12, further comprising:

interpretation target switching unit for determining whether or not the source program must be interpreted according to the history of the simulated execution of the source program.

17. A method of detecting and displaying stalls that occur during pipeline processing, comprising the steps of:

reading a source program;

interpreting the read source program on the basis of processor specifications;

developing the interpreted source program into states in pipeline stages of the pipeline processing;

detecting stalls in the pipeline processing according to the states of the source program developed in the pipeline stages and providing stall information representing the detected stalls;

creating a pipeline image to show the states of the source program, developed in the developing stet), in the pipeline stages; and displaying the source program and corresponding pipeline image concurrently with locations where the detected stalls occur being emphasized according to the stall information provided in the stall detecting step.

18. A computer-readable recording medium containing instructions for causing a computer system to detect and display stalls that occur during pipeline processing by:

interpreting read source program on the basis of processor specifications;

developing the interpreted source program into states in pipeline stages of the pipeline processing;

detecting stalls in the pipeline processing according to the states of the source program developed in the pipeline stages and providing stall information representing the detected stalls;

creating a pipeline image to show the states of the source program. developed in the developing step, in the pipeline stages; and displaying the source program and corresponding pipeline image concurrently with locations where the detected stalls occur being emphasized according to the stall information provided in the stall detecting step.

* * * * *